United States Patent
Robertson et al.

(10) Patent No.: US 10,277,023 B2
(45) Date of Patent: Apr. 30, 2019

(54) AERIAL CABLE LAYING DEVICE

(71) Applicant: Discovery International Geophysics Inc., Saskatoon (CA)

(72) Inventors: Brent Robertson, Hague (CA); Connor Harrison, Hague (CA); Ryan Olson, Dalmeny (CA)

(73) Assignee: Discovery International Geophysics Inc., Saskatchewan (CA)

( * ) Notice: Subject to any disclaimer, the term of this patent is extended or adjusted under 35 U.S.C. 154(b) by 0 days.

(21) Appl. No.: 15/656,726

(22) Filed: Jul. 21, 2017

(65) Prior Publication Data
US 2019/0023520 A1  Jan. 24, 2019

(51) Int. Cl.
| | | |
|---|---|---|
| *H02G 11/02* | (2006.01) | |
| *B65H 49/32* | (2006.01) | |
| *B65H 75/32* | (2006.01) | |
| *B65H 75/30* | (2006.01) | |
| *B65H 57/14* | (2006.01) | |
| *B65H 75/42* | (2006.01) | |
| *H02G 1/02* | (2006.01) | |
| *H02G 1/06* | (2006.01) | |
| *B64D 17/38* | (2006.01) | |
| *B65H 59/04* | (2006.01) | |

(52) U.S. Cl.
CPC ........... *H02G 11/02* (2013.01); *B64D 17/386* (2013.01); *B65H 49/32* (2013.01); *B65H 49/327* (2013.01); *B65H 57/14* (2013.01); *B65H 59/04* (2013.01); *B65H 75/30* (2013.01); *B65H 75/32* (2013.01); *B65H 75/425* (2013.01); *H02G 1/02* (2013.01); *H02G 1/06* (2013.01)

(58) Field of Classification Search
CPC .. H02G 1/02; H02G 1/04; H02G 1/06; H02G 11/02; B64D 17/386; B65H 51/30; B65H 59/04; B65H 75/425
USPC .................................................. 254/134.3 R
See application file for complete search history.

(56) References Cited

U.S. PATENT DOCUMENTS

| | | | |
|---|---|---|---|
| 2,921,549 A | | 2/1960 | Hopper et al. |
| 3,042,385 A | | 7/1962 | Smith |
| 3,211,394 A | * | 10/1965 | Goode ................... B65H 49/02 242/128 |
| 3,243,141 A | | 3/1966 | Cook et al. |
| 3,586,256 A | * | 6/1971 | Wellman ................ B65H 49/32 242/156.2 |
| 5,297,654 A | * | 3/1994 | De Forges De Parny ................... H02G 1/02 182/142 |
| 6,276,503 B1 | * | 8/2001 | Laughlin, Jr. ........ B65H 75/403 191/12.2 A |
| 7,523,890 B1 | | 4/2009 | Heflin et al. |

(Continued)

FOREIGN PATENT DOCUMENTS

| | | | | |
|---|---|---|---|---|
| FR | 2409617 A1 | * | 6/1979 | ............... H02G 1/04 |
| GB | 569015 A | * | 5/1945 | ............... B66D 1/48 |

(Continued)

*Primary Examiner* — Zachary L Kuhfuss
(74) *Attorney, Agent, or Firm* — Patterson Thuente Pedersen, P.A.

(57) ABSTRACT

Cable laying devices for use with aircraft that are airborne are provided, which use a cable spool to deliver cable along a landscape. These devices incorporate a braking means that is actuated by cable tension, a means for cutting the cable which is controlled remotely and/or a motorized winding mechanism.

7 Claims, 8 Drawing Sheets

(56) References Cited

U.S. PATENT DOCUMENTS

| | | |
|---|---|---|
| 7,645,094 B2 | 6/2010 | Krise et al. |
| 2009/0020640 A1 | 6/2009 | Johnston |
| 2013/0146700 A1* | 6/2013 | Wigard ................ B65H 75/425 |
| | | 242/407 |
| 2017/0166422 A1* | 6/2017 | Mahnken ................ A62B 35/00 |

FOREIGN PATENT DOCUMENTS

| | | | | |
|---|---|---|---|---|
| GB | 1335737 A | * | 10/1973 | ................ B64D 1/22 |
| GB | 2069444 A | * | 8/1981 | ............. B65H 49/20 |
| JP | 59069355 A | | 4/1984 | |
| JP | 02223315 A | * | 9/1990 | |
| JP | 04038106 A | * | 2/1992 | |
| JP | 08144218 A | | 6/1996 | |
| JP | 2016160036 A | | 9/2016 | |
| WO | WO 2003/085791 A1 | | 10/2003 | |

* cited by examiner

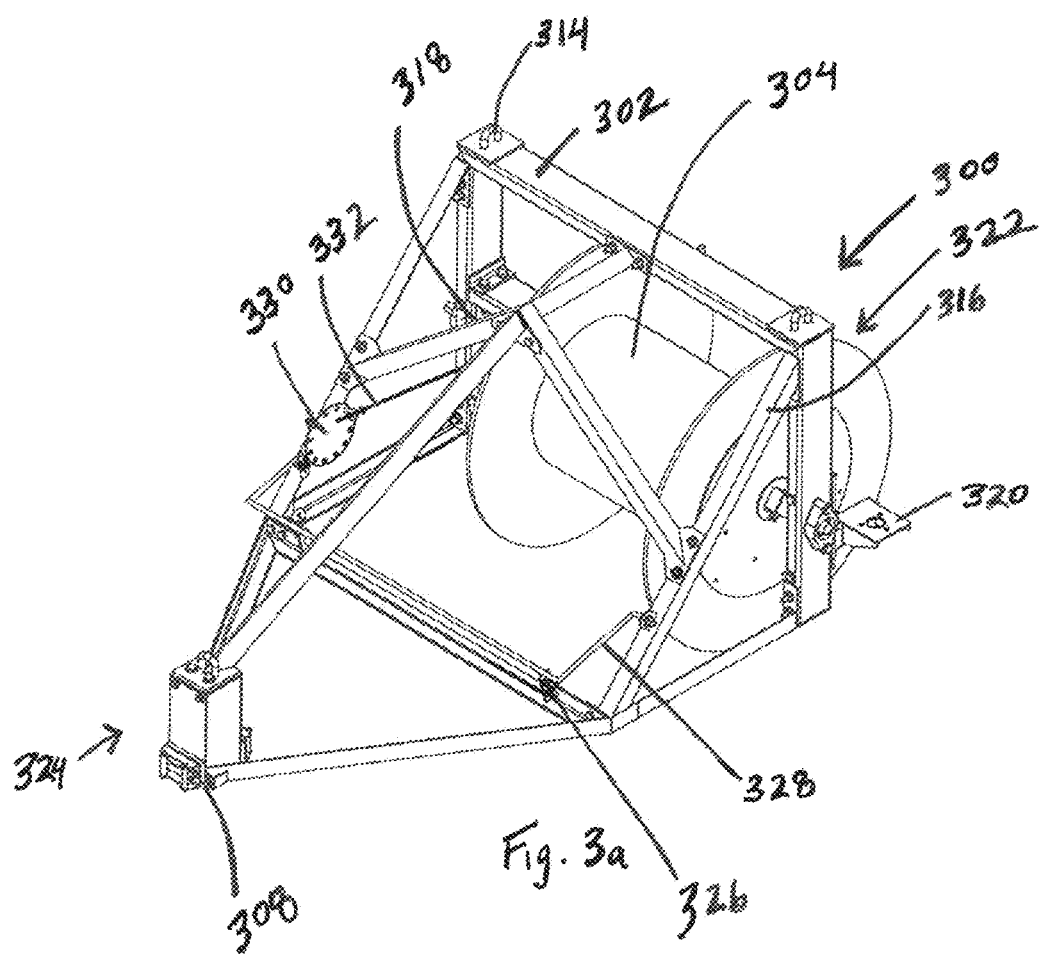

AERIAL CABLE LAYING DEVICE

TECHNICAL FIELD

The present invention relates to cable laying devices for use with an aircraft that is airborne, and more specifically to cable laying devices for use with an airborne aircraft wherein an end of a cable to be laid is attached to the ground.

BACKGROUND

There are a variety of reasons to lay cable, wire or hoses along a landscape or over a series of structures. For example, large amounts of cable and wire may be required to be laid for use with geophysical measurement techniques and methods. The laying of large amounts of cable is also required when hoisting power lines on top of a series of support structures.

Typical ways to lay cable and wire along a landscape can be a labour intensive process depending on the amount and type of cable required. Many organizations invest much time and resources to lay large amounts of cable. Typical ways to lay cable along the ground involve personnel manually spooling out cable while travelling by foot. This may involve using winders that hold spools holding from 100 m to 1000 m of cable. 1000 m of 10 AWG wire weighs approximately 160 lbs and is very difficult to transport by foot. Cable deployment for use with geophysical measurement techniques and methods could take a full day and several personnel members to complete.

Certain areas where cable and wire are to be deployed may be challenging for personnel traveling by foot or land vehicle as a result of the terrain and conditions of the landscape. For example, rocky terrain or densely treed landscapes tend to be areas that can be difficult for personnel that are deploying and laying cable or wire. These type of areas could increase the time for the cable laying process significantly and this can play a significant role for costs. Furthermore, safety issues are usually concerned when such areas are involved.

One way to overcome some of the problems associated with laying cable or other lengths of flexible material is to lay the material from the air. Devices have been developed that are configured to be attached to an aircraft. These devices which are capable of deploying cable for this purpose as well as the aircraft that they are attached to are airborne, thus the many problems as a result of land travel are not present. Furthermore, since an aircraft is supporting the weight of the device and the corresponding cable to be deployed, instead of personnel, larger spools of cable can be used.

For example, airborne systems have been designed for the purpose of laying large amounts of wire (up to 10 km of 10 AWG tracer wire) from a helicopter, therefore reducing the need for ground labor. The wire is loaded onto large wooden or aluminum spools/drums and then tied off on the ground at the start of the proposed wire deployment route. A helicopter long-line is hooked to the device and the device is hoisted off the ground via helicopter and transported, while spooling off wire, in a desired direction, generally following a prepared GPS route utilizing an onboard GPS system. Wire can be deployed using such devices at speeds of up to 20 km/h meaning that 10 km of wire can be laid out in a process that takes approximately 30 to 40 minutes.

It has been found, however, that many airborne devices, as described above, suffer drawbacks.

For example, airborne cable laying devices tend to over spool cable when the speed of the aircraft, to which the device is attached, is decreased. This occurs due to the rotational momentum of the spool as the aircraft slows down causing excess cable to be deployed resulting in slack. Too much cable slack can potentially result in tangling of the cable.

Airborne cable laying devices may be classified as a class C load if the cable is connected to the ground. Typically, in emergency situations that require urgent action, such as engine failure, the pilot would simply jettison the load. This involves disconnecting the airborne cable laying device from the aircraft and letting it fall to the ground, most likely damaging the device. The falling device may also damage property or result in personal injury to individuals on the ground.

Furthermore, winding up large quantities of cable from the field back onto a spool can be time consuming and difficult due the weight of the deployed cable.

What is needed, therefore, are aerial cable laying devices that address the problems described above.

SUMMARY

The present invention therefore seeks to provide for improved aerial cable laying devices that allow for prevention of cable spool rotation resulting in cable slack as cable is being deployed, selective cutting of deployed cable from the device, and mechanical rotation control of the spool.

According to a broad aspect of the present invention, there is provided a cable laying device for use with an aircraft, the device comprising:
- a support frame configured for attachment to the aircraft via an attachment means;
- a cable spool rotatably mounted on the support frame;
- a cable guide means for guiding a cable from or to the cable spool when the cable spool rotates, the cable guide means positioned on the support frame.

Preferably, the attachment means comprises a harness for connecting the aircraft and the support means, allowing the support frame to hang from the aircraft while the aircraft is airborne.

The cable may be for use with geophysical measurement techniques.

In some exemplary embodiments of the aspect of the present invention, the device further comprises a brake assembly for preventing rotation of the cable spool when the brake assembly is engaged. The device may also comprise an actuating member that selectively disengages the brake assembly allowing the cable spool to freely rotate, wherein when the cable from the cable spool engages the actuating member, the brake assembly is disengaged. Preferably, the cable engages the actuating member as cable tension is increased.

In some exemplary embodiments of the aspect of the present invention, the device further comprises a cutter for cutting the cable from the cable spool. Preferably, the cutter is operable by remote control.

In some exemplary embodiments of the aspect of the present invention, the device further comprises a motor operationally connected to the cable spool for selectively rotating the cable spool when the motor is actuated. Preferably, the motor is configured to selectively rotate the cable spool in either of two directions for wrapping the cable onto the cable spool or deploying the cable from the cable spool.

A detailed description of exemplary embodiments of the present invention is given in the following. It is to be understood, however, that the invention is not to be construed as being limited to these embodiments. The exemplary embodiments are directed to a particular application of the present invention, while it will be clear to those skilled in the art that the present invention has applicability beyond the exemplary embodiments set forth herein.

BRIEF DESCRIPTION OF THE DRAWINGS

In the accompanying drawings, which illustrate exemplary embodiments of the present invention:

FIG. 3a is a perspective view of a second embodiment of the present invention;

Exemplary embodiments of the present invention will now be described with reference to the accompanying drawings.

DETAILED DESCRIPTION OF THE DRAWINGS

Throughout the following description, specific details are set forth in order to provide a more thorough understanding to persons skilled in the art. However, well-known elements may not have been shown or described in detail to avoid unnecessarily obscuring the disclosure. The following description of examples of the technology is not intended to be exhaustive or to limit the invention to the precise form of any exemplary embodiment. Accordingly, the description and drawings are to be regarded in an illustrative, rather than a restrictive, sense.

Throughout the following description, the term "cable" should be interpreted to include wire, hose or other flexible materials that would be apparent to a person skilled in the art.

Figure 1:
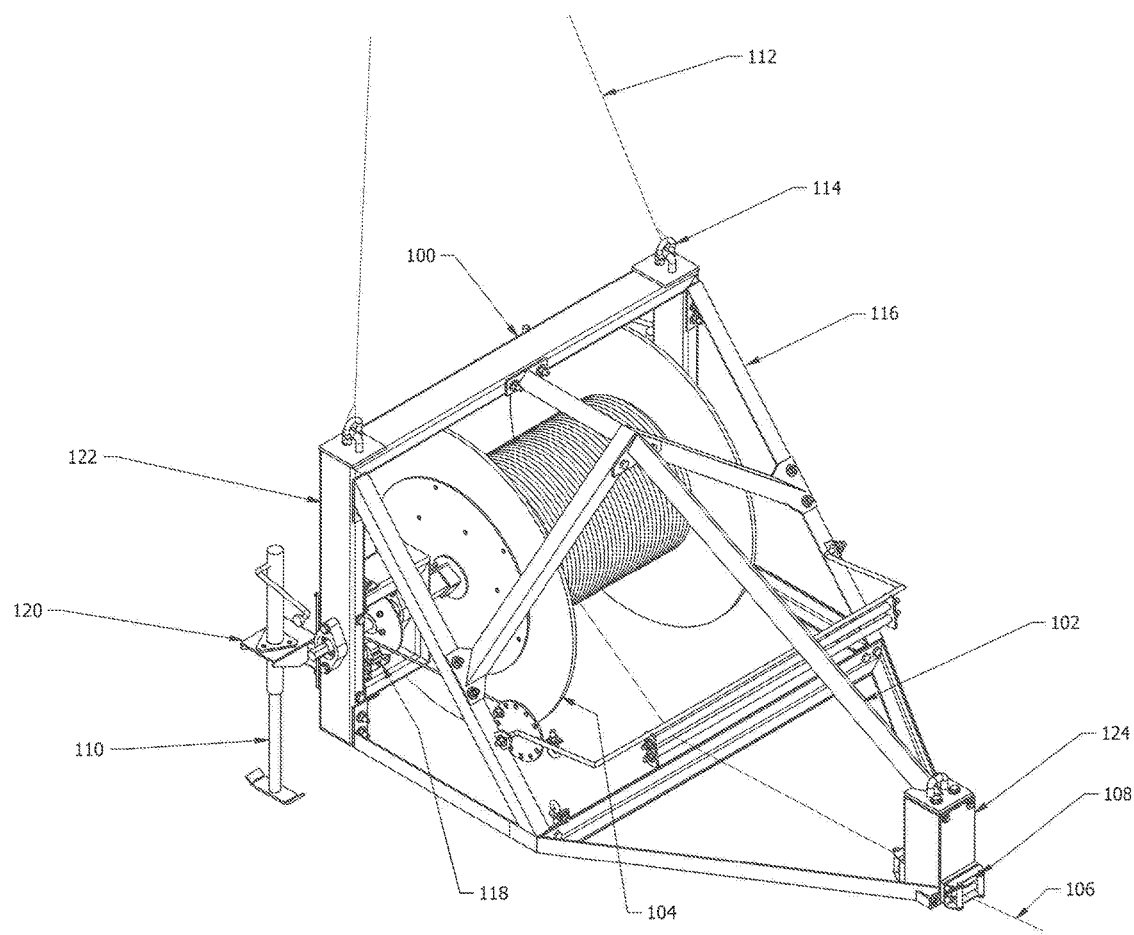
FIG. 1 is a perspective view of a first embodiment of the present invention.

Turning to FIG. 1, a first embodiment of the present invention is illustrated. An aerial cable laying device 100 is shown, comprising a support frame 102 and a cable spool 104 rotatably mounted within the support frame 102. The device 100 is hoisted in the air by an aircraft (not shown) and is connected to the aircraft by a harness 112 that connects to the device 100 at harness connection members 114, allowing the device 100 to hang from the aircraft while airborne.

The support frame 102 comprises a series of support arms 116 configured in manner that provides structural strength to the support frame 102, to support the downward force applied from the deployed cable 106.

The cable spool 104 rotates while deploying cable 106 as the aircraft moves forward. An end of the cable 106 may be tied down to the ground thus rendering the device as a Class C load. As the cable 106 is deployed from the spool 104, it passes through a cable guide 108 which is situated at the rear end 124 of the device 100.

The aerial cable laying device 100 shown also comprises a spool brake assembly 118 that is positioned on the support frame 102 adjacent to an end of the spool 104. The spool brake assembly 118 is configured to prevent rotation of the cable spool 104 when the brake assembly 118 is engaged. Many different braking assemblies 118 for preventing rotation of the cable spool 104 are possible within the scope of the present invention and would be known to those skilled in the art.

The device 100 further comprises an actuating member (not shown) that selectively engages and disengages the brake assembly 118 allowing the cable spool 104 to stop or slow down rotation, or freely rotate, respectively. The cable 106 from the cable spool 104 engages with the actuating member in a manner that causes the brake assembly 118 to disengage allowing the cable spool 104 to freely rotate. Preferably, this occurs when tension is applied to the cable 106. Aspects of the actuating member, which selectively engages and disengages the brake assembly 118, are further described below.

The device 100 may further comprise jack members 110 that are secured by the jack attachment members 120 situated at the front end 122 of the device 100. The jack members 110 are for raising the front end 122 of the device 100 when it is situated on the ground or other surface (not shown) so that the spool 104 does not make contact with the ground or other surface allowing the spool 104 to rotate when needed. The jack members 110 may be electronically or manually operable.

Figure 2:
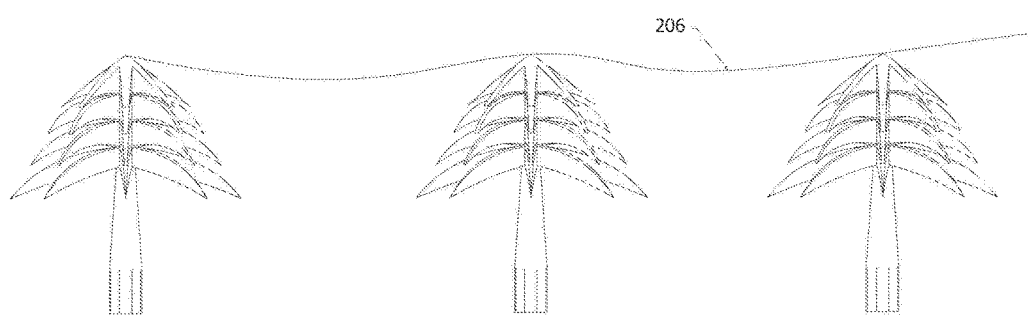
FIG. 2 is view of cable that is deployed by the present invention.
Figure 3B:
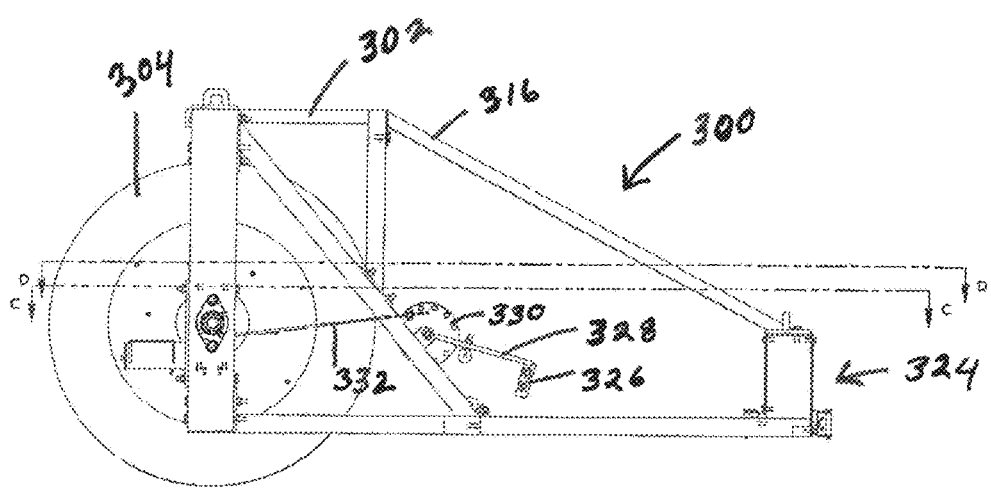
FIG. 3b is a side view of the second embodiment of the present invention.
Figure 3C:
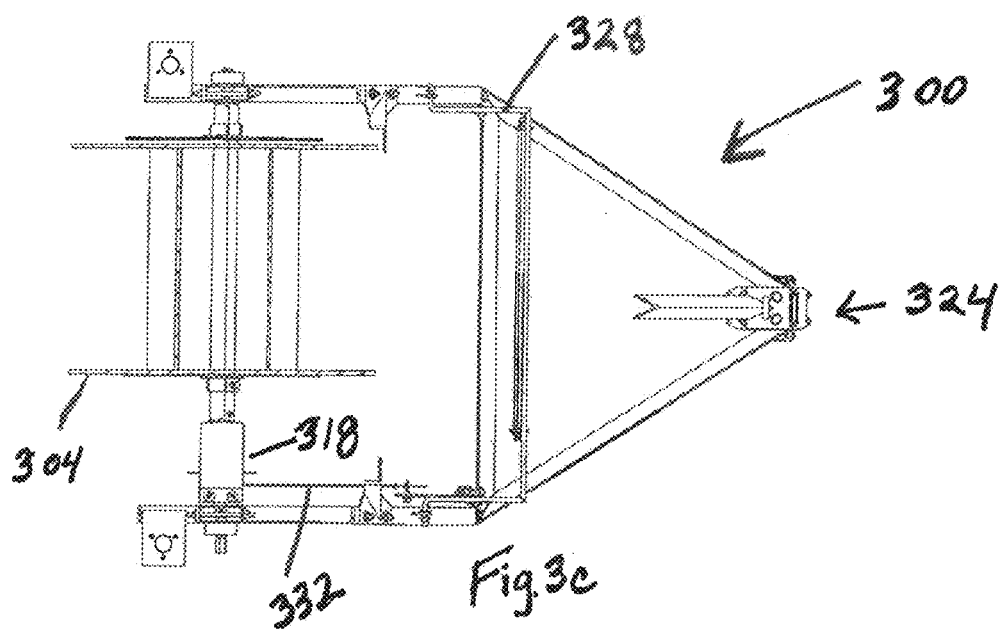
FIG. 3c is a cross sectional top view along line D-D (shown in FIG. 3b) of the second embodiment of the present invention.
Figure 3D:
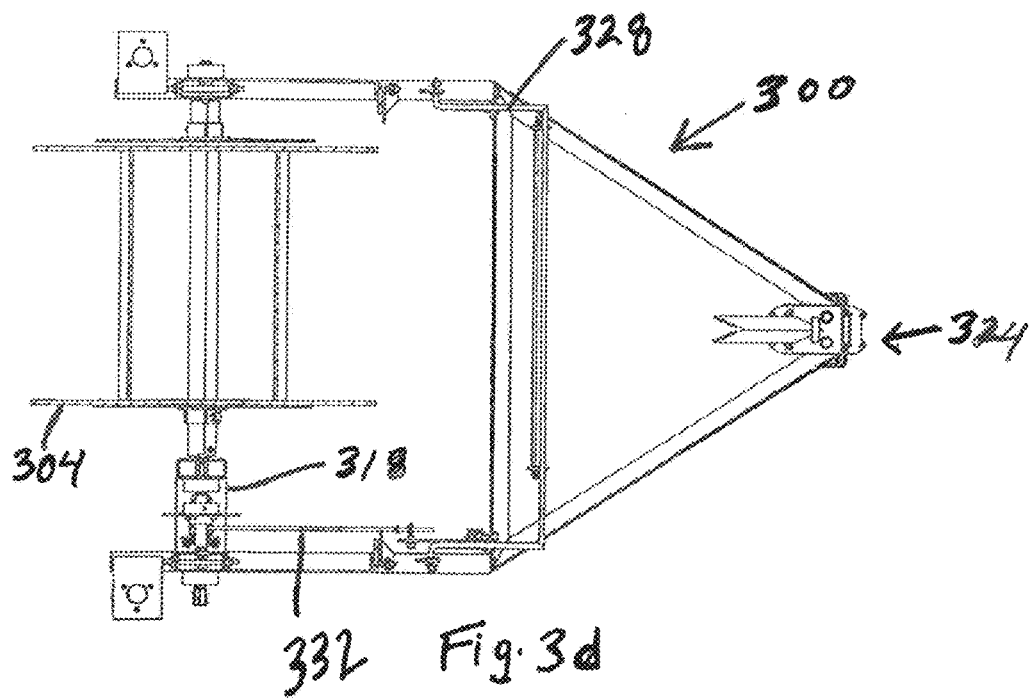
FIG. 3d is a cross sectional top view along line C-C (shown in FIG. 3b) of the second embodiment of the present invention.
Figure 3E:
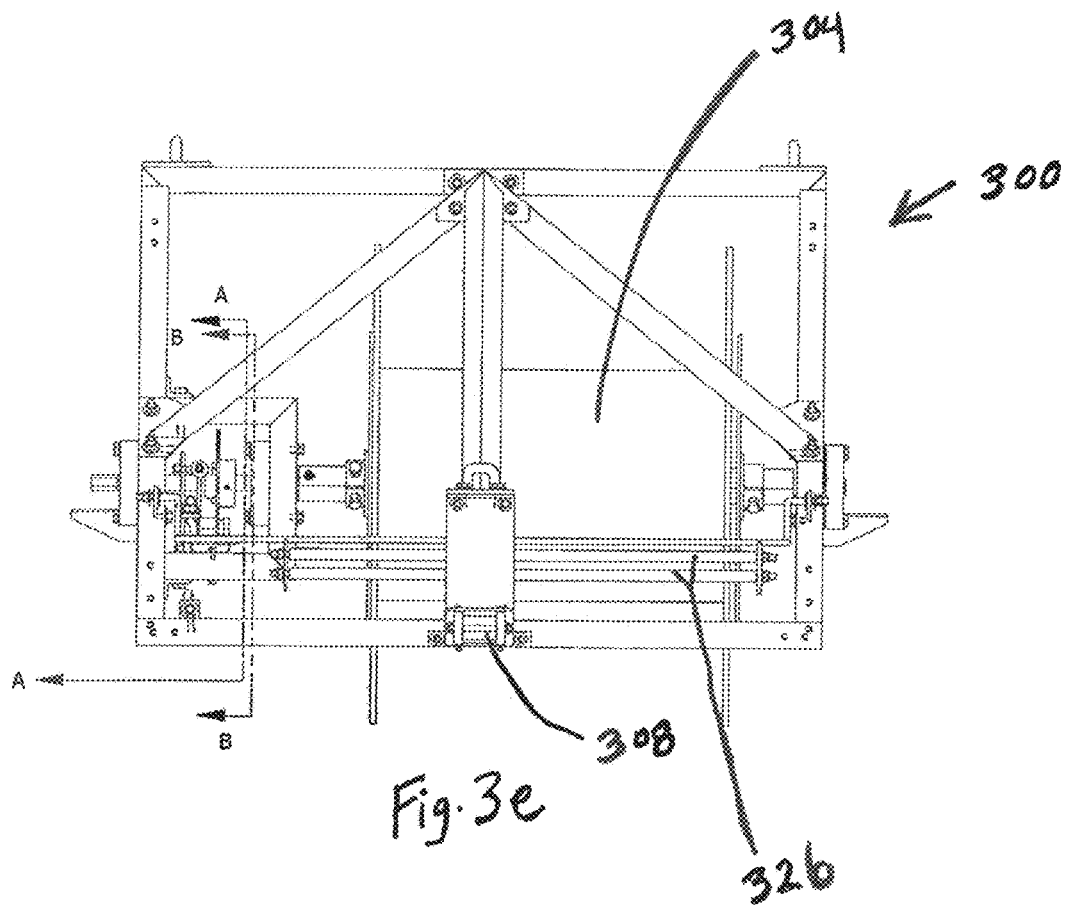
FIG. 3e is a front view of the second embodiment of the present invention.
Figure 3F:
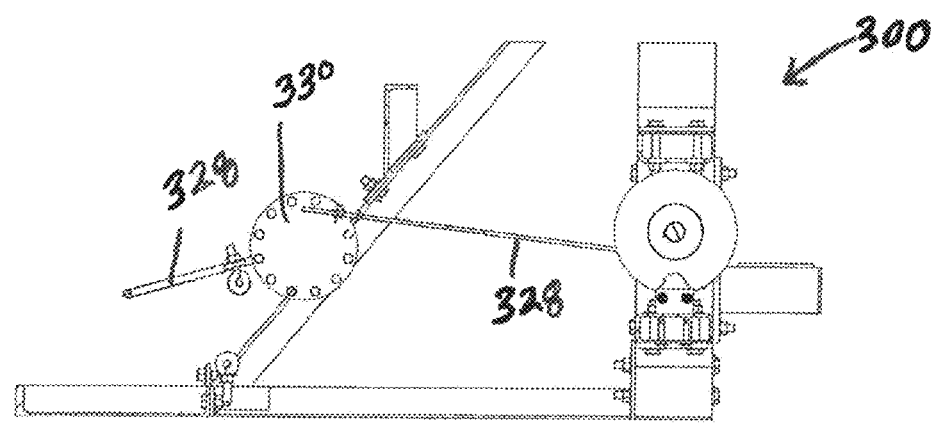
FIG. 3f is a cross sectional side view along line A-A (shown in FIG. 3e) of the second embodiment of the present invention.
Figure 3G:
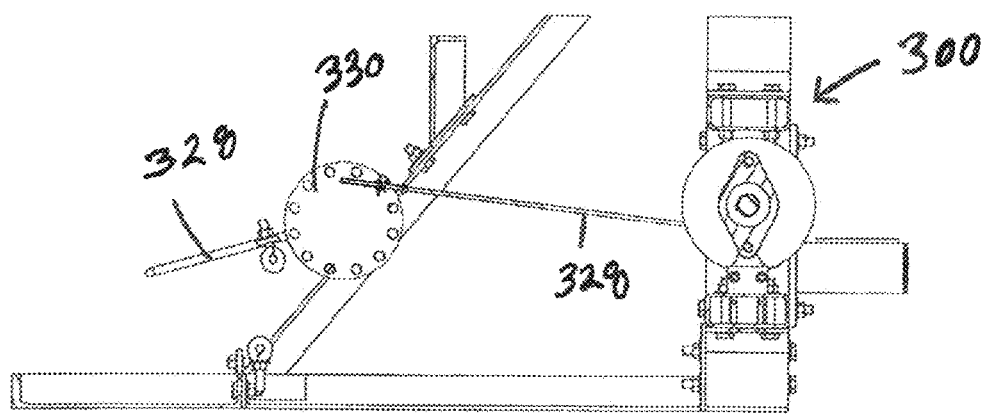
FIG. 3g is a cross sectional side view along line B-B (shown in FIG. 3e) of the second embodiment of the present invention.

The present invention may be used to deploy a variety of types of flexible material that are stored on a spool. For example, the cable 106 that is deployed may be for use with geophysical measurement techniques and methods. As shown in FIG. 2, the cable 206 may be deployed along and over a tree line.

Turning now to FIGS. 3a to 3g, a second embodiment of the present invention is illustrated. A device 300 is illustrated, which shares many features with the device 100 described for the first embodiment.

The device 300 comprises a support frame 302 (comprised of series of support arms 316) and a cable spool 304 rotatably mounted within the support frame 302. Unlike the device 100 (shown in FIG. 1), however, the device 300 does not have jack members installed and is not hoisted in the air by an aircraft. The device may comprise harness connection members 314 and jack attachment members 320.

Similar to the device 100 described for the first embodiment, the device 300 of the second embodiment of the present invention further comprises an actuating member that selectively engages and disengages the brake assembly 318, preventing rotation of the cable spool 304 or allowing the cable spool 304 to freely rotate, respectively.

Figure 4:
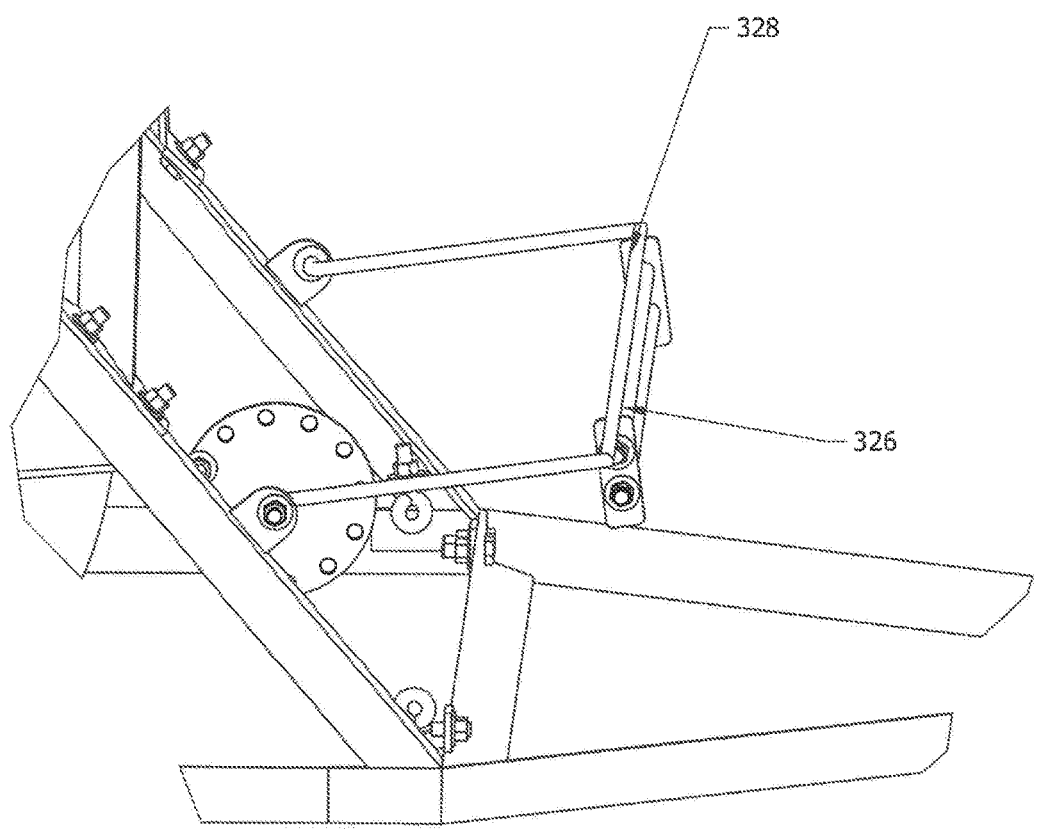
FIG. 4 is a perspective view of a pair of rollers bars of the present invention.

The actuating member comprises a pair of roller bars 326 configured such that cable can pass between the roller bars 326 as it is deployed. The roller bars 326 are mounted on a pivoting bar 328. The pivoting bar 328 extends laterally across the support frame 302 and is pivotably attached to the support frame 302 at one of its ends and attached to an adjustment disc 330 at the other end. The adjustment disc 330 is rotatably attached to the support frame 302. One end of a brake actuating rod 332 is also attached to the adjustment disc 330. The other end of the brake actuating rod 332 operationally engages with the spool brake assembly 318 causing it to engage or disengage. The roller bars 326 and pivoting bar 328 are also shown in FIG. 4.

The adjustment disk 330 is designed to set the braking system relative to the amount of brake padding that is left on the spool brake assembly 318. As the brake pads wear down, an adjustment may be required to account for pad wear.

It is preferable that the spool brake assembly 318 is configured to stop the spool rotation in about ten rotations at a full cable load if the aircraft were to come to a complete stop. This can prevent a pile up of cable on the ground that may become tangled when the aircraft resumes a forward motion.

In operation, the cable from the spool 304 is fed through the pair of roller bars 326, which are mounted on a pivoting bar 328, and then through the rear cable guide 308. When the brake actuating rod 332 is in a down position, the spool brake assembly 318 is engaged and the spool 304 will not rotate. As the device 300 is moved forward, cable is pulled straight from the top of the spool 304 though the rear cable guide 318 causing the pivoting bar 328 to lift up due to the cable tension. This in turn causes the adjustment disc 330 to rotate in manner such that the brake actuating rod 332 disengages spool brake assembly 318, thus allowing the spool 304 to rotate.

When the aircraft carrying the device 300 slows down during cable deployment, tension is released and the brake actuating rod 332 drops, resulting in the brake assembly 318 to engage. This allows for the cable to be deployed without over-spooling from the angular momentum of the spool 304 that may cause the cable to tangle.

Preferably, the brake assembly 318 is comprised of a brake disc, lever actuated mechanical brake caliper, and brake pads. The brake disc is mounted on an axle connected to the spool axle through a keyed connection, locking the rotation of the spool 304 to the rotation of the brake disc. The brake caliper is mounted on the frame 302 in such a way that when actuated, the brake pads are engaged on the brake disc, stopping the rotation of both the disc and spool 304 through friction. The caliper is actuated by the brake actuating rod 332 when tension on the cable is applied.

In some embodiments, instead of a system that selectively disengages the brake assembly allowing the cable spool to freely rotate, as described above, an adjustable friction brake is used, which is engaged to a certain amount of pressure and keeps constant tension and drag on the cable and spool to avoid over-spooling and tangling.

In these embodiments it is preferable that the brake assembly consists of a brake disc, screw actuated hydraulic or mechanical brake caliper, and brake pads. The brake disc is mounted on an axle connected to the spool axel through a keyed connection, locking the rotation of the spool to the rotation of the brake disc. The brake caliper is mounted on the frame in such a way that when actuated, the brake pads are partially engaged on the brake disc, slowing down the rotation of both the brake disc and spool through friction. The caliper is actuated by a set screw which is set prior to deployment such that the brake provides a constant friction opposing the spool rotation, limiting the spools rotational velocity, and bringing the spool to a stop once the rotational force caused by the cable being pulled off is stopped.

The device 300 of the second embodiment of the present invention further comprises a cutter 334 for cutting the cable from the cable spool 304. Preferably, the cutter 334 is operable by remote control. The cutter 334 is provided within the cable guide 308 located at the rear end 324 of the device 300.

In operation, cable feeds through the cutter 334 and cable guide 308, whereby the aircraft pilot can remotely activate a cutting blade of the cutter 334 to shear the cable so as to release the device 300 from the cable connected to the ground below. The aircraft carrying the device 300 no longer has a class C load. This can eliminate the need to jettison the device 300 in certain situations. The pilot can then then fly back to a landing site to drop off the device 300.

Preferably, for safety reasons, to ensure that the pilot does not press the wrong control by mistake, the pilot key fob can only be used to extend the actuator and cut the cable. The crew on the ground hold onto the master key fob for disengaging the blade again.

In some embodiments, the cutter operates with a radio controlled actuator ram (not shown), with a cutting blade mounted onto the ram. The blade moves downward into a position whereby the cable is pressed onto a high density polyethylene cutting block and is cut into two pieces, one of which falls to the ground and one that stays connected to the device 300. After the cable is cut, since the cable from the spool 304 has no tension, the brake assembly 318 is engaged and the cable spool 304 does not freely rotate. Many different cutters for cutting the cable from the cable spool 304 are possible within the scope of the present invention and would be known to those skilled in the art.

Figure 5A:
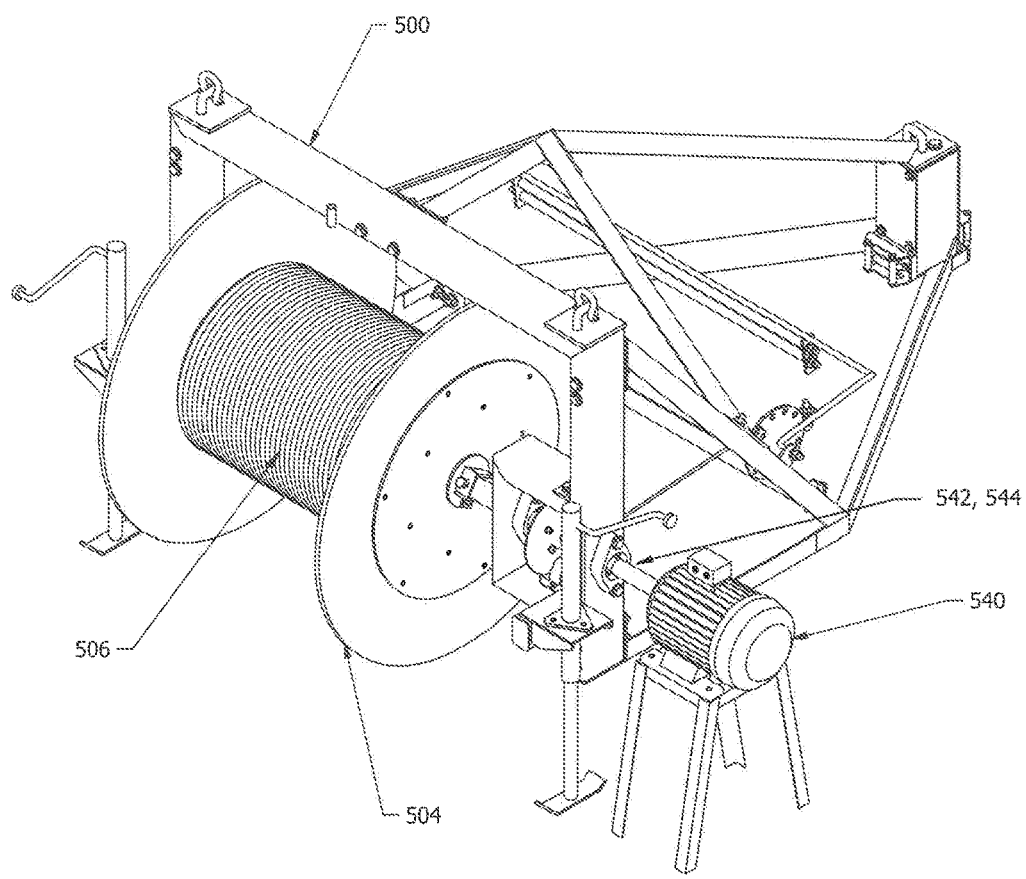
FIG. 5a is a perspective view of a third embodiment of the present invention.
Figure 5B:
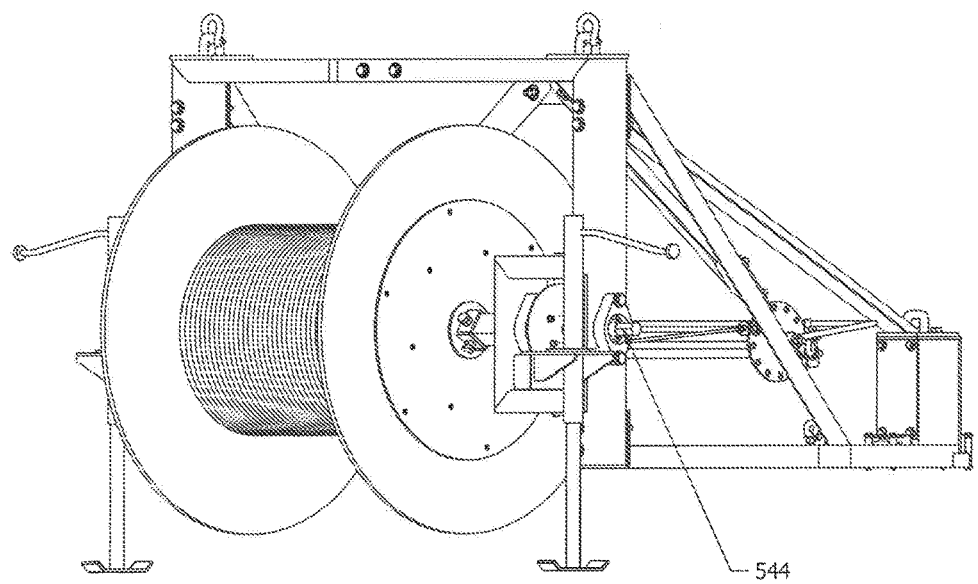
FIG. 5b is a perspective view of the third embodiment of the present invention wherein the motor has been removed.

Turning now to FIGS. 5a and 5b, a third embodiment of the present invention is illustrated. A device 500 is illustrated, which shares many features with the devices 100, 200 described for the first and second embodiments.

The device 500 further comprises a motor 540 operationally connected to the cable spool 504 for selectively rotating the cable spool 504 when the motor 540 is actuated. Preferably, the motor 540 is configured to selectively rotate the cable spool 504 in either of two directions for wrapping the cable 506 onto the cable spool 504 or deploying the cable 506 from the cable spool 504.

As shown in FIG. 5a, the motor 540 is positioned to the side of the support frame. A female hexagonal drive bit 542 on the motor 540 engages with the male drive end 544 on the device axle.

In some embodiments, the motor operates off either DC or AC power. This depends on whether the device 500 is airborne and operating off the aircraft DC power, or operated on the ground where the device can use a portable AC generator. The motor 540 may also operate off a variable speed DC controller, whereby as a potentiometer dial is increased, the speed of the rotating spool 504, which is connected to the motor 540, also increases.

In operation, the motor allows re-spooling of the cable 506 onto the spool 504 from the air or on the ground. The motor 540 can also assist in deployment of the cable. FIG. 5b illustrates the device 500 wherein the motor has been removed. The process for deploying cable 506 may initially involve mounting an empty spool 504 into the support frame 502 of the device 500. A DC motor drive is mated to a hexagonal drive end on the axle that rotates the spool 504. Cable 506 from another spool may be fed through a wire counter or another means to measure the amount of cable being spooled, and attached to the center of the empty spool 504. The DC motor 540 is actuated and the spool 504 rotates while wrapping cable 506 onto itself. Once the desired length of cable 506 has been loaded onto the spool 504, the device 500 is transported to a starting point via aircraft or land vehicle, depending on the logistical circumstances. The cable is reeled off, through a set of rollers bars and through a rear cable guide before being tied off to a tree or another anchor point.

A harness connected to an aircraft is hooked onto the device 500 so it is ready for slinging. The aircraft then lifts the device 500 and begins to move in the desired direction, laying the wire along a pre-determined route that may be pre-programmed into the aircraft's onboard GPS. As the device begins to move forward, the tension on the cable increases, lifting up on the pivoting bar resulting in the brake assembly disengaging. If the device slows down during cable deployment then tension is released and the pivoting bar drops resulting in the brake assembly engaging again. This allows for the cable to be deployed without overspooling from the angular momentum and resulting in the cable tangling. Once the cable on the spool runs out, it simply drops from the device 500.

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to".

"connected", "coupled", or any variant thereof, means any connection or coupling, either direct or indirect, between two or more elements; the coupling or connection between the elements can be physical, logical, or a combination thereof.

"herein", "above", "below", and words of similar import, when used to describe this specification shall refer to this specification as a whole and not to any particular portions of this specification.

"or", in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of methods and apparatus have been described herein for purposes of illustration. These are only examples. The technology provided herein can be applied to contexts other than the exemplary contexts described above. Many alterations, modifications, additions, omissions and permutations are possible within the practice of this invention. This invention includes variations on described embodiments that would be apparent to the skilled person, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The foregoing is considered as illustrative only of the principles of the invention. The scope of the claims should not be limited by the exemplary embodiments set forth in the foregoing, but should be given the broadest interpretation consistent with the specification as a whole.

The invention claimed is:

1. A cable laying device for use with an aircraft, the device comprising:
    a support frame configured for attachment to the aircraft via an attachment means;
    a cable spool rotatably mounted on the support frame;
    a cable guide means for guiding a cable from or to the cable spool when the cable spool rotates, the cable guide means positioned on the support frame;
    a braking assembly for preventing rotation of the cable spool when the braking assembly is engaged; and
    an actuating member that selectively disengages the braking assembly allowing the cable spool to freely rotate, wherein when cable from the cable spool engages the actuating member, the braking assembly is disengaged;
    wherein the cable engages the actuating member as cable tension is increased.

2. The device of claim 1 wherein the attachment means comprises a harness for connecting the aircraft and the support means, allowing the support frame to hang from the aircraft while the aircraft is airborne.

3. The device of claim 1 wherein the cable is for use with geophysical measurement techniques.

4. The device of claim 1 further comprising a cutter for cutting the cable from the cable spool.

5. The device of claim 4 wherein the cutter is operable by remote control.

6. The device of claim 1 further comprising a motor operationally connected to the cable spool for selectively rotating the cable spool when the motor is actuated.

7. The device of claim 6 wherein the motor is configured to selectively rotate the cable spool in either of two directions for wrapping the cable onto the cable spool or deploying the cable from the cable spool.

* * * * *

UNITED STATES PATENT AND TRADEMARK OFFICE
CERTIFICATE OF CORRECTION

PATENT NO. : 10,277,023 B2
APPLICATION NO. : 15/656726
DATED : April 30, 2019
INVENTOR(S) : Brent Robertson et al.

Page 1 of 1

It is certified that error appears in the above-identified patent and that said Letters Patent is hereby corrected as shown below:

On the Title Page

At item (56) References Cited, under U.S. Patent Documents, Line 1 delete "2,921,549 A" and insert -- 2,923,549 --.

Signed and Sealed this
Eighteenth Day of June, 2019

Andrei Iancu
*Director of the United States Patent and Trademark Office*